350-6.9 SR REFERENCE SEARCH ROOM
XR 2,997,539 7C
X2501

Aug. 22, 1961 H. BLACKSTONE 2,997,539

SCANNING MECHANISM

Filed April 16, 1953

INVENTOR.
HENRY BLACKSTONE
BY
Mitchell & Bechert
ATTORNEYS

2997539
NO OR CLASSIF 2,997,539
Patented Aug. 22, 1961

2,997,539

SCANNING MECHANISM

Henry Blackstone, Northport, N.Y., assignor to Servo Corporation of America, New Hyde Park, N.Y., a corporation of New York Filed Apr. 16, 1953, Ser. No. 349,117
13 Claims. (Cl. 178—7.6)

My invention relates to an improved optical-scanning means and to radiation-responsive means utilizing such optical scanning. The present applicaiton incorporates certain improvements over and modifications of the invention disclosed in the copending patent application of Henry Blackstone and Frank G. Willey, Serial No. 320,272, filed November 13, 1952.

It is an object of the invention to provide improved means for continuously and automatically scanning a field of view for varying energy levels in such field.

It is a specific object to provide an improved scanning mechanism whereby the focus of one or more of the optical systems in such scanning mechanism may be brought to a location externally of the scanner itself, whereby energy-responsive means at such focus may be more ruggedly mounted and otherwise more conveniently utilized.

It is another specific object to provide an improved scanner construction whereby the convergent bundle of rays from a plurality of optical systems in the scanner may be directed along the scanner axis, or substantially along the same, even though the axes of the various optical systems of the scanner are directed primarily outwardly of the scanning axis.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Briefly stated, my invention contemplates an optical scanner in which one or more optical systems are mounted for rotation about a scanning axis. The optical systems have axes directed primarily radially with respect to the scanning axis, and means including an inclined reflector permit convergence of rays collected by the respective optical systems substantially along the scanning axis. If the optical systems are all alike and if the mirrors are all similarly inclined, then all optical systems may be brought to a common focus on the scanning axis, and a single energy-responsive means located at said focus may respond to the energy collected by the one or more optical systems. Various means for producing this general result will be discussed in detail.

Figure 1:
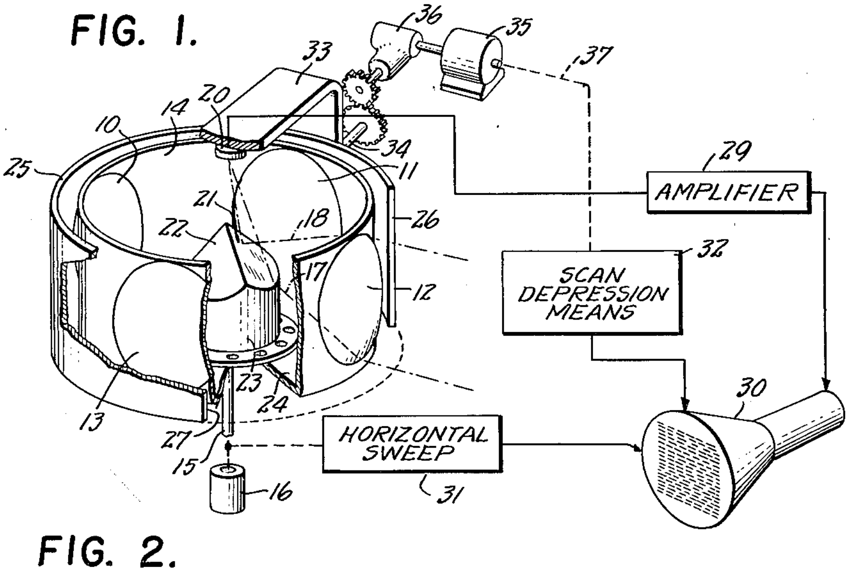
FIG. 1 is a simplified view in perspective illustrating major elements of a scanner and signal-processing means incorporating features of the invention.

In FIG. 1, I illustrate application of my invention to a scanner in which a plurality of collecting optical systems 10—11—12—13 is mounted in angularly spaced relation on a scanner drum 14 for rotation about a scanning axis, which in FIG. 1, may be considered to be represented by a drive shaft 15 connected to motor means 16 for supplying the rotary drive. The rays collected by the respective optical systems will all be convergent, as in the case of limiting rays 17—18 within the scanner drum, and for a purpose which will become clear, the focal length of the optical systems in FIG. 1 preferably exceeds the radial spacing of such optical systems with respect to the scanning axis.

In order to bring the converging rays from all optical systems into common focus at a single energy-responsive means 20, I provide further optical means for redirecting the convergent rays, predominantly in the direction of the scanning axis. In the form shown, such further means comprises a plurality of reflecting surfaces, such as the surface 21 for the optical system 12, and the surface 22 for the optical system 13. The reflecting surfaces 21—22 are carried for rotation with the scanner 14 and, therefore, they may be solidly fixed thereto. Since, in the form shown, the optical systems are lenses, there is no problem of interference as between the mirror 21 of one optical system and the mirror 22 of another optical system, and I have therefore shown the mirrors 21—22 all formed as polished plane surfaces on the same upstanding prism 23 secured to the base 24 of the scanner 14.

For situations in which the various optical systems in the scanner 14 are successively to scan a limited angular field of view, as in the case of forms discussed in greater detail in the above-identified Blackstone et al. patent application, it is desirable to employ shield means 25 extending circumferentially of the scanner 14 and providing, between angularly spaced limits 26—27, a window opening through which the successive optical systems may be caused to scan such field.

For display purposes, the energy collected by the responsive means 20 may be amplified, as at 29, for supply to the intensity-modulation connection of a cathode-ray tube 30. The horizontal sweep for tube 30 may be generated in a conventional circuit 31 synchronized to recycle with each succeeding sweep of an optical system past the field of view, and I have schematically indicated this synchronization by a broken-line connection to motor 16.

Depending upon the specific use to which the described apparatus is to be put, various further control and signal-processing may be applied to the display on tube 30; for example, a camera with a continuously moving film may develop a strip record of succeeding sweeps on the face of tube 30, all as discussed in the said Blackstone et al. application. Alternatively, scan-depression means 32 may generate a vertical sweep signal for the tube 30, so that successive sweeps may be observed on the face of tube 30 for a given desired number of optical sweeps per frame. Also, in the form shown, the entire scanner 14 including the non-rotated shield 25 is mounted within support means 33, inclinable about what may be termed a scan-depression axis denoted in FIG. 1 by a tilt shaft 34. I show motor means 35 for driving the scanner about the scan-depression axis, as through reduction gearing 36, and I indicate by broken line 37 that the scan-depresssion means 32 may be synchronized with the physical displacement of the scanning unit during a scan-depression movement. If desired, the entire scan-depression cycle may be automatically initiated and completed at the push of a button, as disclosed in greater detail in the copending Blackstone application, Serial No. 339,701, filed March 2, 1953, now Patent No. 2,914,608, issued November 24, 1959.

Figure 2:
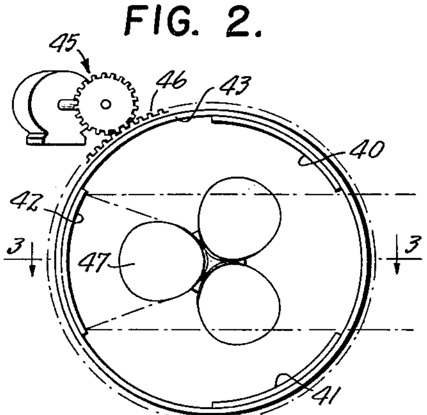
FIG. 2 is a simplified plan view of a scanner representing a modification of that shown in FIG. 1.
Figure 3:
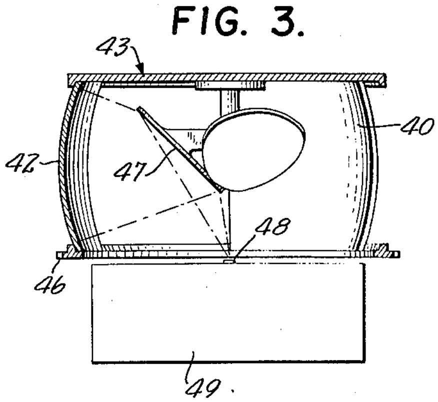
FIG. 3 is a vertical sectional view of the scanner of FIG. 2, as seen in the plane 3—3 of FIG. 2.

In FIGS. 2 and 3, I show a slight modification of the arrangement of FIG. 1, wherein the plurality of optical system 40—41—42 in the scanner drum 43 includes concave mirrors having focal lengths exceeding the radial spacing of such mirrors about the scanning axis. The drive to the scanner 43 may be imparted by means 45 meshing an external gear 46 about the scanner 43. As will be seen in FIG. 3, for the case of the mirror 42, a separate inclined mirror 47, which may be optically flat, may be inclined intermediate the directions of the scanning axis and of the collecting optical axis and may promote convergence of the collected rays generally in the direction of the scanning axis, as for focus upon the active surface of energy-responsive means 48 located on the scanning axis. FIG. 3 graphically demonstrates that the energy-responsive means 48 may be located externally of the scanner or, at least, substantially offset from the general plane of the collecting axis, so as to provide a rugged stationary foundation for the energy-responsive means, as for promotion of utmost sensitivity and noise reduction. I schematically designate at the outline 49 that the base, foundation, frame, or other essential part of the energy-responsive means 48 may be of great bulk and need in no sense interfere with the rotating parts of the scanner, and yet energy collected by any one, or by all, of the collecting optical systems 40—41—42 may be focused upon the energy-responsive means 48, regardless of angular position and, of course, as limited by shield means (not shown in FIGS. 2 and 3) of the type generally discussed at 25 in connection with FIG. 1.

Figure 4:
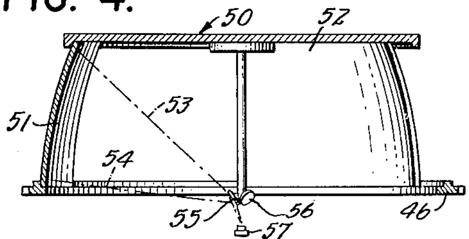
FIGS. 4, 5 and 6 are views similar to FIG. 3, but illustrating further modifications.

In FIG. 4, I show how ray-interference within the scanner 50 may be reduced to a minimum by eccentric employment of the collecting optical systems 51—52 forming part of the scanner unit. By tilting the mirrors 51—52, the axis of convergent rays, as at 53—54, becomes similarly inclined, and with sufficient tilting these rays may be focused substantially on the scanning axis so that the active surface of the energy-responsive means might just as well be located at such point. However, since with the scanning sweep the incidence of converging rays might be considered to vary between such limits as to impose severe limitations on the performance of the energy-responsive means, I illustrate my preference for employment of separate mirrors 55—56 of the general character discussed in connection with the other forms of the invention. Mirrors 55—56 are shown to divert all collected rays to a common focal point at energy-responsive means 57. Since the converging rays in FIG. 4 have substantially reduced the spread of collected energy at the location of mirrors 55—56, these mirrors may be correspondingly smaller, so that even if they were to project within the volume of the scanner 50, they would constitute substantially no interference with incoming rays.

Figure 5:
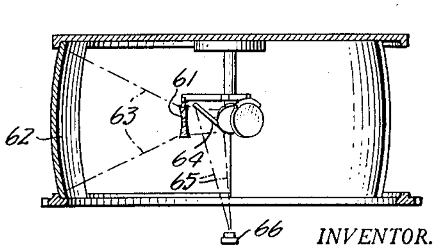
Figure 6:
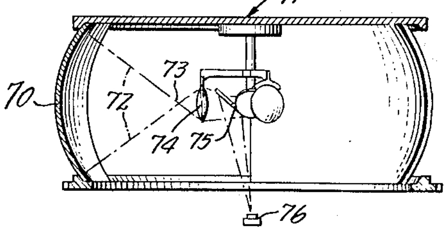

In FIGS. 5 and 6, I show two alternative arrangements for reducing ray-interference effects within the volume of a scanner 60. The means employed in both these arrangements involves the use of a secondary optical element, which may (in the case of FIG. 5) be a diverging lens 61 functioning with a primary collecting element 62, which may be a concave mirror, and intercepting the converging rays thereof on the optical axis, but at a location of very substantially converged energy, as suggested by the limiting rays 63. The function of the secondary optical element 61 may be in effect to extend the focal length of the collecting optics, as with a reduced angle of spread between limiting rays. Mirror means 64 may, as previously described, transpose these lens-converged limiting rays into general alignment with the scanning axis, as suggested by the limiting rays 65, and for focus upon the sensitive surface of energy-responsive means 66 located preferably on such axis. It will be seen that for the arrangement of FIG. 5 the focal length for the primary collecting optics 62 may correspond substantially with the radial spacing thereof from the scanning axis, and that the secondary optical elements 61 and mirrors 64 should be provided in duplicate for each optical system and carried for rotation with the scanner.

In FIG. 6, I show a combination substantially the same as that in FIG. 5, except that the focal length of the primary collecting optical element 70 is substantially less than the radial spacing of such element 70 from the axis of scanning means 71. Therefore, the converging rays 72 from element 70 cross over at their focal point 73 at a location short of the scanning axis; and a correcting secondary element 74, which may again be a lens, must serve as a convergent lens, in order to correct the then-diverging rays for relatively low-angle convergence so as to effectively extend the focal length. Reflecting means 75 may in all respects resemble that described at 64 in FIG. 5, so that energy-responsive means 76 may receive the energy collected from all optical systems, yet it may be located in non-interfering relation with the rays passing across and within the scanner 71.

It will be seen that I have described relatively simple scanner constructions, all of which lend themselves to employment with signal-processing and display means of the character discussed in connection with FIG. 1, or in either of the above-mentioned copending patent applications. While the principle of the invention is applicable to the collection of and response to energy of any wavelength to which the apparatus may respond, I find the arrangement specifically applicable to photoelectric or infra-red scanning, as by employing a photoelectric cell as the energy-responsive means, or by employing any other type cell, depending upon the desired radiation response. The construction is particularly applicable for situations in which super-cooled detectors are to be employed, as when it is necessary to supply bulky refrigerating means immediately adjacent the detector element; for such situations, element 49 in FIG. 3 will be understood to designate the housing for refrigeration equipment.

While I have described the invention in detail for the preferred forms shown, it will be understood that modifications may be made within the scope of the invention as defined in the claims which follow.

I claim:

1. In combination, a cylindrical drum scanner having an axis of rotation and comprising a plurality of like angularly spaced optical systems having generally radially directed axes, mirror means within and mounted for rotation with said scanner, said mirror means including a plane mirror surface for each optical system, the planes of said mirror surfaces being inclined with respect to the respective optical axes to an extent directing said optical axes in general alignment with said axis of rotation and substantially to a common intersecting focal point on the axis of scanning rotation.

2. In combination, a scanner drum comprising a plurality of like lenses angularly spaced about an axis of scanning rotation and having optical axes generally radially directed with respect to said scanning axis, an inclined plane mirror for each lens and carried for rotation about the scanning axis with rotation of said scanner, each mirror being located radially between the scanning axis and the lens corresponding thereto and the plane of each said mirror being inclined by an amount sufficient to produce focus on the scanning axis of rays collected by said lens, the point of focus on said scanning axis being offset from the general radial plane through which said lens axes scan.

3. In combination, a scanner comprising an odd number of like collecting mirrors angularly spaced about a rotary scanning axis and spaced from each other by an amount corresponding substantially to the effective width of each said mirrors, plane reflecting mirrors carried one for each collecting mirror for rotation with rotation of said scanner and on the same rotary axis, the plane of each said mirror being inclined at an angle intermediate the direction of the scanning axis and the direction of the collecting axis corresponding thereto and directing the rays collected by each collecting mirror to a focal point on said scanning axis.

4. In combination, a scanner comprising a plurality of collecting optical systems angularly spaced about a rotary scanning axis, each optical system having a collecting axis generally radially directed with respect to the scanning axis, and further optical means carried for rotation with each said optical system and converging rays collected by each of said respective optical systems to a common focal point on said scanning axis and axially offset from the substantially radial plane common to said optical axis.

5. The combination of claim 4, in which the focal length of each of said optical systems exceeds the radial spacing of said optical systems about the scanning axis, and in which said further optical means includes for each optical system an inclined plane mirror tilted intermediate the respective collecting optical axes and the scanning axis.

6. The combination of claim 4, in which the focal length of each said optical system substantially coincides with the radial spacing of said optical systems from the scanning axis, and in which said further optical means comprises diverging-lens means symmetrically disposed about the scanning axis and intercepting the converging rays from said optical systems at a substantially converged location short of the focal point thereof, whereby the size of said further optical means may be relatively small compared with that of said collecting optical systems and yet the effective focal point for resulting less-convergent rays may be substantially extended, and inclined mirror means intercepting said less-convergent rays and projecting them for focus off the plane of the axes of said optical systems.

7. The combination of claim 4, in which the focal length of each said optical system is substantially less than the radial spacing of said optical systems from the scanning axis, and in which said further optical means comprises converging-lens means symmetrically disposed about the scanning axis and intercepting rays from said optical systems at a substantially converged location beyond the focal point, whereby the size of said further optical means may be relatively small compared with that of said collecting optical systems and yet the effective focal point for resulting less-convergent rays may be substantially extended, and inclined mirror means intercepting said less-convergent rays and projecting them for focus off the plane of the axes of said optical systems.

8. In combination, scanning means comprising a plurality of like optical-collecting systems angularly spaced about a rotary scanning axis and having collecting axes generally radially directed with respect to said scanning axis, whereby said collecting axes may be swept through a radial plane upon rotation about said scanning axis, each optical system comprising a relatively large primary collecting optical element for relatively sharply converging collected rays within said scanner, a second optical element of relatively small size on the optical axis and located at a position in which rays collected by the primary optical element have been substantially converged, said second optical element substantially reducing the angle between limiting rays from said primary optical element, whereby the focal length thereof is substantially extended, and a reflecting mirror in the path of rays emanating from said secondary element and directing rays from the primary collecting axis substantially along said scanning axis, the focal points for all said optical systems being on said scanning axis.

9. The combination of claim 8, in which said secondary optical element is a diverging lens located on the converging bundle of rays from said primary collecting element.

10. The combination of claim 8, in which said secondary optical element is a converging lens spaced from said primary collecting element by more than the focal length of said primary collecting element, whereby said secondary element converts rays diverging after crossover into a longer-focus converging bundle.

11. In a scanner, optical means including a plurality of optical systems angularly spaced about a scanning axis, said optical systems being oriented with their response axes directed primarily radially of said scanning axis, but with such axes slightly inclined from a radial plane about said axis so as to produce ray-convergence at an axially offset location near said scanning axis, said optical means being focused on said scanning axis at a location axially offset from the substantial volume of said scanner, and energy-responsive means on said scanning axis at the focus of said optical means.

12. A scanner according to claim 11, in which said optical systems are of focal length sufficient to span said scanning axis, and in which said optical means further includes for each optical system a plane inclined mirror deflecting converging rays to said energy-responsive means.

13. In combination, an optical scanner comprising a plurality of like focusing optical systems in angularly spaced relation and mounted for bodily rotary displacement about a scanning axis and with their respective axes generally radially directed with respect to said scanning axis, the focal lengths of said optical systems exceeding the radial spacing of said optical systems about said scanning axis, radiation-responsive means responsive to radiation collected by said optical systems and having an active part thereof mounted on and facing in the direction along said scanning axis and therefore generally perpendicular to the radial plane through which an optical axis is displaced upon scanning rotation, each optical system including a mirror inclined intermediate said scanning axis and the radial scanned plane, each said mirror being positioned near but slightly radially offset from said scanning axis and being oriented to deflect radially collected rays of its optical system in a direction generally along but convergent upon said scanning axis at said radiation-responsive means, and drive means for rotating said scanner.

References Cited in the file of this patent

UNITED STATES PATENTS

| | | |
|---|---|---|
| 34,970 | Kolb | Apr. 15, 1862 |
| 705,771 | Lumiere | July 29, 1902 |
| 1,655,185 | Hatschek | Jan. 3, 1928 |
| 1,708,746 | Hofe | Apr. 9, 1929 |
| 1,960,514 | Ross | May 29, 1934 |
| 1,988,303 | Donle | Jan. 15, 1935 |
| 2,211,320 | Efron | Aug. 13, 1940 |
| 2,419,459 | McDowell | Apr. 22, 1947 |
| 2,420,951 | William et al. | May 20, 1947 |
| 2,532,098 | Holcomb | Nov. 28, 1950 |